United States Patent
Sheriff et al.

(10) Patent No.: US 11,689,505 B2
(45) Date of Patent: Jun. 27, 2023

(54) DYNAMIC PROXY RESPONSE FROM APPLICATION CONTAINER

(71) Applicant: Cisco Technology, Inc., San Jose, CA (US)

(72) Inventors: Akram Sheriff, San Jose, CA (US); Nagendra Kumar Nainar, Morrisville, NC (US); Arvind Tiwari, Cary, NC (US); Rajiv Asati, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/304,891

(22) Filed: Jun. 28, 2021

(65) Prior Publication Data

US 2022/0417219 A1 Dec. 29, 2022

(51) Int. Cl.
*G06F 15/173* (2006.01)
*H04L 9/40* (2022.01)
*H04L 67/56* (2022.01)
*H04L 43/08* (2022.01)
*H04L 67/10* (2022.01)
*G16Y 10/75* (2020.01)

(52) U.S. Cl.
CPC .......... *H04L 63/0281* (2013.01); *H04L 43/08* (2013.01); *H04L 63/0263* (2013.01); *H04L 63/10* (2013.01); *H04L 63/1408* (2013.01); *H04L 67/10* (2013.01); *H04L 67/56* (2022.05); *G16Y 10/75* (2020.01)

(58) Field of Classification Search
None
See application file for complete search history.

(56) References Cited

U.S. PATENT DOCUMENTS

| | | | | |
|---|---|---|---|---|
| 10,929,415 B1 * | 2/2021 | Shcherbakov | ...... | G06F 3/04842 |
| 11,334,543 B1 * | 5/2022 | Anwar | ............... | G06F 16/2228 |
| 11,347,577 B1 * | 5/2022 | Bath | ................... | G06F 11/0772 |
| 2011/0314148 A1 * | 12/2011 | Petersen | ............. | H04L 63/1408 |
| | | | | 709/224 |
| 2012/0246303 A1 * | 9/2012 | Petersen | ............. | G06F 16/1734 |
| | | | | 709/224 |

(Continued)

OTHER PUBLICATIONS

The PCT Search Report and Written Opinion dated Sep. 27, 2022 for PCT application No. PCT/US2022/034501, 15 pages.

(Continued)

*Primary Examiner* — Phuoc H Nguyen
(74) *Attorney, Agent, or Firm* — Lee & Hayes, P.C.

(57) ABSTRACT

This disclosure describes using a dynamic proxy for securing communications between a source within a cloud environment and an application container. The techniques include intercepting traffic directed to an application container, analyzing the traffic and traffic patterns, and allowing or preventing the traffic from being delivered to the application container based on the analysis. A traffic analysis engine may determine whether the traffic is considered safe and is to be allowed to be delivered to the application container, or whether the traffic is considered unsafe and is to be prevented from being delivered to the application container, According to some configurations, the address(es) to the network interfaces (e.g., WIFI or Eth0) are abstracted to help ensure security of the application containers.

20 Claims, 6 Drawing Sheets

(56) References Cited

U.S. PATENT DOCUMENTS

| | | |
|---|---|---|
| 2017/0353496 A1* | 12/2017 | Pai .......................... H04L 63/10 |
| 2018/0139238 A1* | 5/2018 | Schultz ............... H04L 63/1491 |
| 2019/0273746 A1 | 9/2019 | Coffing |
| 2019/0379590 A1 | 12/2019 | Rimar et al. |
| 2020/0112487 A1 | 4/2020 | Inamdar et al. |
| 2020/0278892 A1 | 9/2020 | Nainar et al. |
| 2020/0319935 A1 | 10/2020 | Srivastava et al. |
| 2021/0019194 A1 | 1/2021 | Bahl et al. |
| 2021/0099394 A1 | 4/2021 | Sharma et al. |

OTHER PUBLICATIONS

Raza Almas et al: "7 Requirements for Optimized Traffic Fl.ow and Security in Kubernetes—The New Stack", Apr. 14, 2021 (Apr. 14, 2021), pp. 1-23, XP055961937, Retrieved from the Internet: URL:https://web.archive.org/web/20210414174319/https://thenewstack.io/7-requirements-for-optimized-traffic-fl.ow-and-security-in-kubernetes/ [retrieved on Sep. 16, 2022] p. 2-p. 3 p. 5-p. 7.

* cited by examiner

DYNAMIC PROXY RESPONSE FROM APPLICATION CONTAINER

TECHNICAL FIELD

The present disclosure relates generally to techniques for securing communication to containers in a cloud environment.

BACKGROUND

Enterprises are moving to different cloud models, such as hybrid clouds, multi-clouds, and connected cloud networks. In a multi-cloud environment, there are often different microservices and application containers hosted on the internet of things (IoT) Gateways or on the Edge Computing Hardware for performing various processing functions and integrating with different instances of cloud services. In many examples, the mode of communication for the application containers (running at the edge to the cloud) uses a publish-subscribe communication method, or some type of client-broker communication method, such as Message Queue Telemetry Transport (MQTT). Securing communications to application containers that may be in different public/private networks, however, can be challenging. For example, application containers in a multi-cloud environment cannot be secured 100% just by using an Access Control List (ACL) or an IP Network Address Translation (NAT).

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
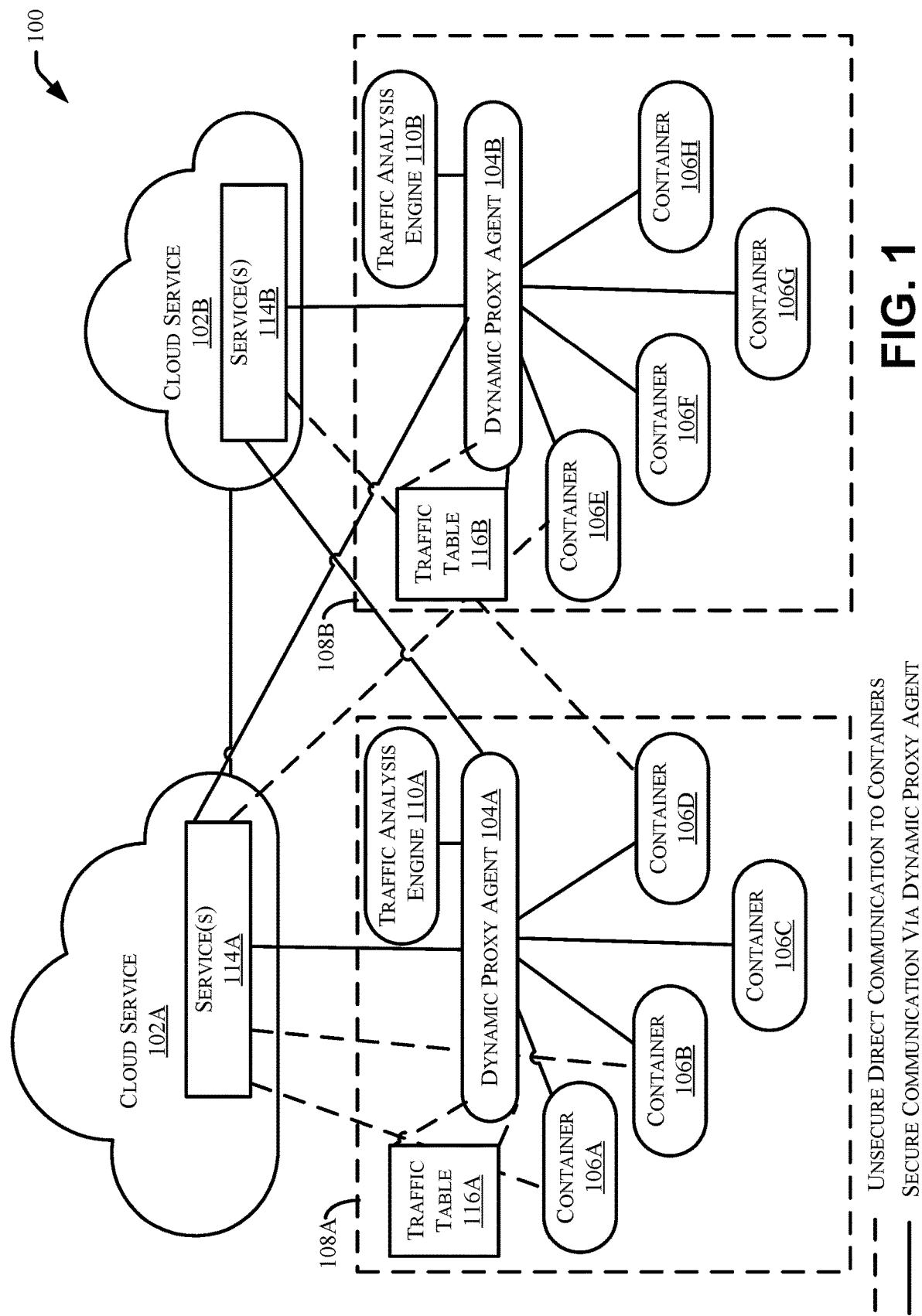
FIG. 1 illustrates a system that uses a dynamic proxy agent to help secure communications to application containers in a multi-cloud environment.

This disclosure describes techniques for using a dynamic proxy for securing communications between a source within a cloud environment and an application container. The techniques include intercepting traffic directed to an application container, analyzing the traffic and traffic patterns, and allowing or preventing the traffic from being delivered to the application container based on the analysis. According to some examples, the address(es) to the network interfaces (e.g., WIFI or Eth0) are abstracted to help ensure security of the application containers. The techniques described herein may be performed by a system and/or device having non-transitory computer-readable media storing computer-executable instructions that, when executed by one or more processors, performs the methods described

Example Embodiments

Cloud-native applications, comprising multiple "microservice" applications supported by a service mesh, are becoming more widely used. Instances of the microservice applications may be hosted at different locations, and the microservice applications instances may communicate with each other over one or more networks, such as software-defined wide-area networks SD-WANs. A cloud-native application is a collection of small, independent, and loosely coupled services. In contrast to employing a monolithic architecture, many cloud-native applications employ a microservice architecture. In a monolithic architecture, an application is typically built as a single deployable unit. By contrast, in a microservice architecture, a complex system may be split into multiple independent, narrowly focused services, each with its own isolated business logic and data store. In some examples, services of the cloud-native application may be distributed across different cloud environments including one or more public cloud environments, and one or more private networks. In a microservice architecture, typically, any service can be scaled and deployed separately.

A service mesh may be utilized to control how the microservices and other parts of an application share data with one another. A service mesh is a dedicated configurable infrastructure layer built right into an application, typically designed to handle a high volume of network-based inter-process communication using application programming interfaces (APIs). The service mesh may provide capabilities such as service discovery, load balancing and encryption. The service mesh may be implemented by providing a proxy instance, called a sidecar, for each microservice application instance. Sidecars may manage interservice communication over the SD-WAN, monitoring, and security related concerns and/or other functions that may be abstracted away from the individual microservice application instances.

In a cloud environment, such as a multi-cloud environment, there are often different microservices and application containers hosted on the Internet of Things (IoT) Gateways or on the Edge Computing Hardware for performing various processing functions and integrating with different instances of cloud services. The mode of communication between the application containers (e.g., running at the edge to the cloud) and other endpoints, such as in the cloud, could use a publish-subscribe communication method, some type of client-broker communication method, such as MQTT. Prior to techniques described herein, however, in both communication methods, the application container is mapped and tied to physical network or virtual network interfaces (e.g. fast ethernet (FE), gigabit ethernet (GE), WIFI, cellular radio, virtual ethernet (vEth)). Not abstracting the application container's network interface creates a high likelihood of exposing the network interface details in the data packets communicated between a cloud network and an application container.

Using techniques described herein, a dynamic proxy agent helps to secure communications to containers, such as one or more application containers that are hosted on an IoT gateway, on edge computing hardware, or at some other location. The dynamic proxy agent may receive incoming traffic from different services located in one or more cloud services and determine whether to allow the traffic to be delivered to an application container or prevent the traffic from being delivered.

In some examples, a traffic analysis engine (e.g., a webhook server, or some other device or component) may perform an analysis of the traffic and/or traffic patterns directed to the application container is performed. The traffic analysis engine may perform a deep packet inspection of the traffic and may identify information such as a source of the incoming traffic (e.g., a microservice, a Virtual Private Cloud (VPC), . . . ), an end-to-end traffic analysis that identifies information the different points the incoming traffic has passed from the source to the dynamic proxy agent, patterns identified that are associated with the source (e.g., how often does the source send traffic to an application container), and the like. In some examples, a virtual probe (e.g., in a webhook server) may be used in the analysis of the traffic.

The traffic analysis engine may determine whether the traffic is considered safe and is to be allowed to be delivered to the application container, or whether the traffic is considered unsafe and is to be prevented from being delivered to the application container. Many different techniques may be used to determine whether or not the incoming traffic to the container is safe, such as but not limited to: Is the source of the traffic from a trusted network?; Has the traffic passed through any points that are unsecure?; Has the application container received traffic from this source before?; and the like. If the traffic analysis engine does not identify security threat(s) or any other anomalies are discovered, then the source of the traffic may be authorized and allowed to send data, via the dynamic proxy agent, to the application container.

According to some configurations, data indicating whether traffic is authorized and/or unauthorized is maintained by the dynamic proxy agent. For example, the dynamic proxy agent may maintain a traffic table/list that includes entries identifying the sources for authorized traffic and/or identifying the sources for unauthorized traffic. For example, the traffic table may include an entry that indicates to allow traffic from a particular source IP address (or some other identifier), that is directed to a particular application container(s) within a pod. In some configurations, traffic received from the source may be restricted to particular time frames (e.g., 12 PM-3 PM, 6 AM-5 PM, . . . ). According to some examples, after a source (e.g., a microservice source of the cloud native application) is allowed, any further traffic that is received by the dynamic traffic agent from that source may be allowed without further inspection. In other examples, a traffic analysis may be performed each time traffic is received, and/or at some other interval or in response to some event/condition.

In other examples, when the traffic analysis engine determines that the incoming traffic is unsecure, the incoming traffic from that specific source (e.g., microservice and/or virtual private network (VPN)) originating from a cloud service is blocked from being delivered to the application container. In some configurations, incoming traffic that is identified as unsecure may be redirected to a different location, such as a quarantine worker container. In other examples, a micro segmentation based security policy may be used to isolate application containers from each other which are running on the same node.

The dynamic proxy agent may also abstract the network interface details to access application containers. In this way, the network interface details for the application containers are not exposed when communicating with services in different clouds and/or at other network locations. In some configurations, a hash value may be used to abstract the network interface details for the containers secured by the dynamic proxy agent. The dynamic proxy agent may also abstract an identifier of the application containers in addition to the exposed network interfaces. In contrast to existing techniques, the dynamic proxy agent as described herein can abstract the IoT gateways from a security attack vector perspective by masking the MAC Address of the WIFI or ethernet NIC that is present in the IoT gateway's physical interface. The techniques described herein may be performed by a system and/or device having non-transitory computer-readable media storing computer-executable instructions that, when executed by one or more processors, performs the methods described herein.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system 100 that uses a dynamic proxy agent 104 to help secure communications to containers 106 in a multi-cloud environment. As illustrated in FIG. 1, cloud service 102A and cloud service 102B communicate with application containers 106A-106H via dynamic proxy agents 104A-104B (as illustrated by the solid lines between the service(s) 114A and 114B and the dynamic proxy agents 104A and 104B) instead of direct communication to the application containers (as illustrated by the dashed lines) as in prior techniques.

In a cloud environment, such as a multi-cloud environment as illustrated in FIG. 1, there are often different microservices and application containers 106 hosted on Internet of IoT Gateways/nodes 108 for performing various processing functions and integrating with different services 114 in cloud services 102. See FIG. 3 and related discussion for an example IoT gateway node.

As illustrated in system 100, a dynamic proxy agent 104, such as dynamic proxy agent 104A and dynamic proxy agent 104B can be used to help secure communications to a container, such as application containers 106A-106D hosted by IoT gateway 108A and application containers 106E-106H that are hosted by IoT gateway 108B. Instead of service(s) 114A of cloud service 102A and service(s) 114B of cloud service 102B communicating directly with the containers 106, a dynamic proxy agent 104 is used by the service(s) 114 to securely communicate with the application containers 106.

When traffic is sourced from outside of the IoT gateways 108 (e.g., different hybrid-cloud services) into pods running the containers 106, a dynamic proxy agent 104 receives the incoming traffic and causes traffic analysis to be performed. In some examples, the dynamic proxy agent 104 sends the incoming traffic to a traffic analysis engine 110 to perform traffic analysis. According to some configurations, the traffic analysis engine 110 may be a webhook server which uses a virtual probe for traffic monitoring. While traffic analysis engine 110A is shown separately from dynamic proxy agent 104A, the traffic analysis engine 110A may be part of the dynamic proxy agent 104A. In some examples, operations of the dynamic proxy agent 104A may performed within a primary node agent, such as within a kubelet in the Kubernetes as a traffic engineering probe. Also, while the traffic analysis engine 110 is shown separate from the dynamic proxy agent 104, some/all of the functionality of the traffic analysis engine may be performed by the dynamic proxy agent.

A traffic analysis engine 110, such as traffic analysis engine 110A and traffic analysis engine 110B may perform a traffic analysis to determine whether traffic received from a service 114 is considered safe and is to be allowed to be delivered to the application container 106, or whether the traffic is considered unsafe and is to be prevented from being delivered to the application container. As discussed briefly above, many different techniques may be used to determine whether or not the incoming traffic to the container is safe, such as but not limited to: Is the source of the traffic from a trusted network?; Has the traffic passed through any points that are unsecure?; Has the application container received traffic from this source before?; and the like.

According to some configurations, the traffic analysis engine 110 may perform a deep packet inspection (DPI) of the traffic received from a service 114 that is hosted in a cloud service 102 and/or at some other location that is external from the application containers 106. The traffic analysis engine 110 may identify information such as a source of the incoming traffic (e.g., the IP address of the service 114, VPC, or some other source of the traffic). In some examples, the traffic analysis engine 110 performs an end-to-end traffic analysis that identifies information the different points the incoming traffic has passed from the source to the dynamic proxy agent 104A. The traffic analysis engine 110 may also identify traffic patterns that are associated with the source such as how often does the service send traffic to an application container, and the like.

Over time the traffic analysis engine 110 may learn the communication patterns from the application containers 106 to external networks, such as between IoT gateway 108A and/or 108B and cloud service 102A and/or cloud service 102B. The traffic communication patterns may be to specific services 114, to VPCs hosted by a cloud service, and/or to some other external source of traffic. According to some configurations, the dynamic proxy agent 104 creates a traffic table 116, such as traffic table 116A and traffic table 116B that maps sources, such as in cloud service 102A and/or 102B, learned over time. In some configurations, the dynamic proxy agent 104A stores entries into the table to indicate whether traffic is allowed to the container and/or whether traffic is unauthorized to be delivered to the container.

If the traffic analysis engine 110 does not identify security threat(s) or any other anomalies are discovered, then the service 114 may be authorized to send data, via the dynamic proxy agent 104, to the application container 106 to which the traffic is directed. According to some configurations, data indicating whether traffic is authorized and/or unauthorized is maintained by the dynamic proxy agent 104. For example, the dynamic proxy agent 104 may maintain a traffic table/list 116 that includes entries identifying the sources for authorized traffic and/or identifying the sources for unauthorized traffic. For example, the traffic table 116 may include an entry that indicates to allow traffic from a particular source IP address (or some other identifier), that is directed to a particular container(s) within a pod. In some configurations, traffic from the source may be authorized for delivery at certain times and prevented at other times (e.g., allow from 8 AM-5 PM and restrict between 5 PM-8 AM). In some configurations, the traffic table 116 may be updated based on traffic patterns detected over time and/or traffic analysis performed at different times.

As briefly discussed above in more detail below, the dynamic proxy agent 104 may abstract identifying information for the application containers 106. In some examples, the dynamic proxy agent 104 abstracts the exposed network interface(s) of the application containers 106. In some examples, a hash may be generated by the dynamic proxy agent 104, the traffic analysis engine 110, and/or some other device or component used to abstract the identifying information for the application container 106. The hash may be generated using different attributes associated with the application container 106 and/or the service 102 which is the source of the traffic. The attributes for generating the hash may include but are not limited to a MAC address, a time which communication with the service 114 are allowed, an identity of the cloud service 102, an identifier of the container 106, and the like. Since the dynamic proxy agent 104 may be component accessible across different containers 106, the CPU & Memory resources used to run the dynamic proxy agent 104 are minimal.

Figure 2:
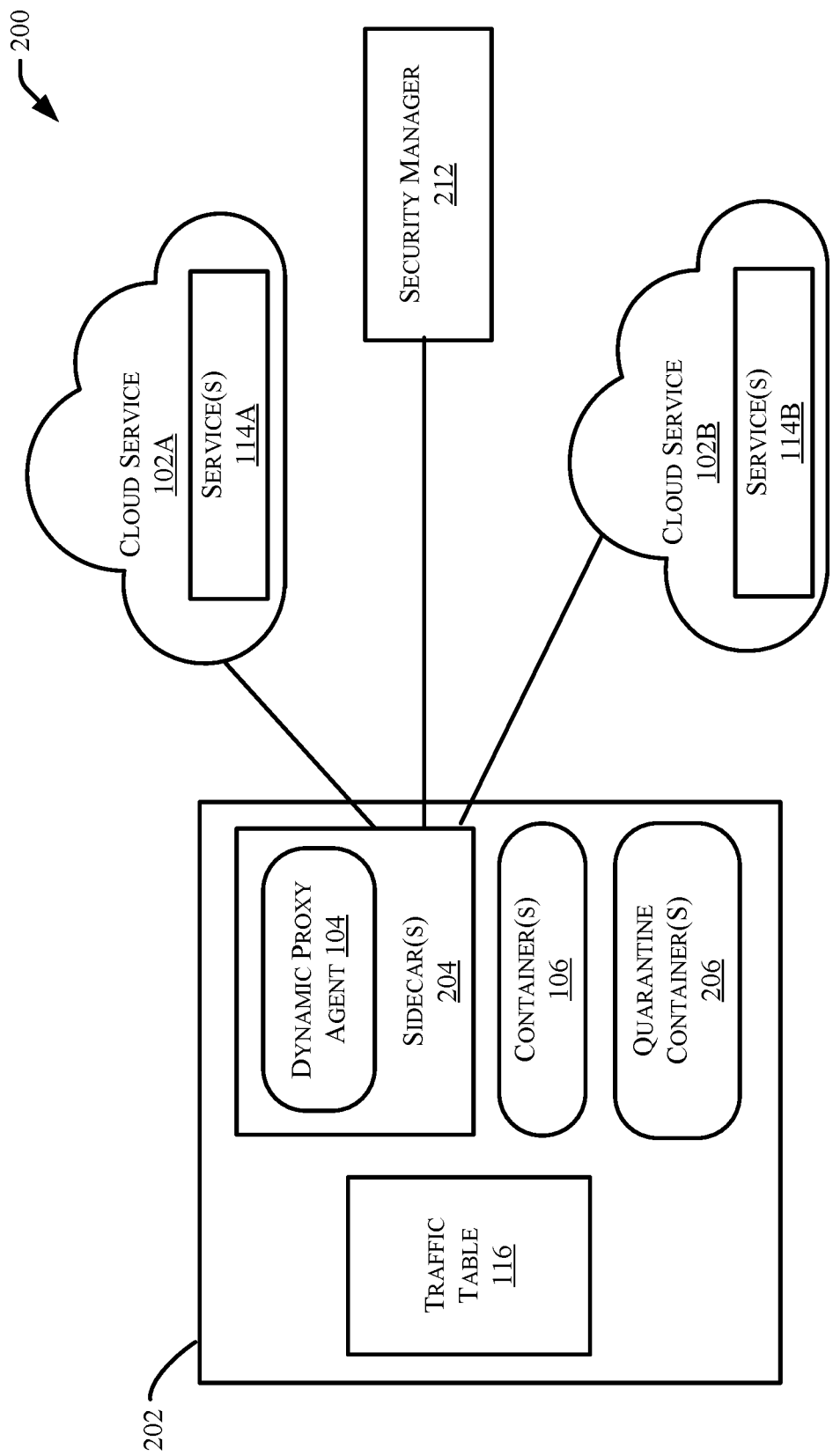
FIG. 2 illustrates a system to configure and use a dynamic proxy agent to help secure communications originating from different cloud services.

FIG. 2 illustrates a system 200 to configure and use a dynamic proxy agent 104 to help secure communications originating from different cloud services 102. Referring to FIG. 2, dynamic proxy agent 104 is configured to send and receive data to/from different networks, such as to service(s) 114A of cloud service 102A and service(s) 114B of cloud service 102B.

According to some configurations, one or more sidecars 204 are associated with application container(s) 106 that are within a pod, such as pod 202. A sidecar 204 is an application design abstraction, which may abstract features such as inter-service communications, monitoring and security, away from a main architecture of an application. Sidecars are typically used within a service mesh control plane, to manage and configure each sidecar in relation to its associated service. Network traffic from the associated service is filtered through the sidecar. The abstraction of the sidecar may ease changing certain features, handled by the sidecar, without changing the rest of the application. Furthermore, if an organization is using Kubernetes (an open-source container-orchestration system) or a similar system to monitor application containers 106, the application containers 106 can be grouped together in a pod 202 that shares a common namespace.

According to some examples, in contrast to abstracting an interface of a single entry point, the dynamic proxy agent 104 abstracts the IoT gateways from a security attack vector perspective by masking the MAC Address of the WIFI or ethernet NIC that is present in the gateway's physical interface, such as the physical NIC card 312. As such, the edge network interface is abstracted and a mapping is created between the different sources of incoming traffic and the application containers 106. The source may be a particular source of the traffic, a VPC (Virtual Private Cloud), VPC's public subnet details, and the like. As discussed above, the dynamic proxy agent 104 may add entries to the table 116 that includes data associated with the ingress (App's Network Interface) and the egress being the details of the source of the traffic. When an application on an IoT gateway wants to send data to a cloud service 102 to which it is mapped (as indicated in the traffic table 116), then the application container accesses the egress decision path via the dynamic proxy agent 104. The dynamic proxy agent 104 internally abstracts as to which cloud service is trying to communicate to and the source MAC address is masked by the dynamic proxy agent 104. Similarly, if a service 114 running in the cloud service 102 wants to communicate with an application container running on a gateway, then the dynamic proxy agent 104 masks the source of origination of that traffic by parsing through the table 116.

According to some examples, the dynamic proxy agent 104 generates a hash using a hashing algorithm (e.g., message digest 5 (MD5), secure hash algorithm (SHA), . . . ) to abstract the physical address of the container. As an example, Hash=Function_(Src_ip,Src_VPC, Dest_URI, Timestamp, Dest_Port, Random Seed/NONCE or Unique_Container_worker_ID_based).

A separate sidecar 204 can be used to perform functionality relating to authorizing traffic to flow to one or more containers and the like. visualize how each container in the same pod is operating and/or perform other functionality. In the system 200, the dynamic proxy agent 104 may be a sidecar that communicates with other sidecar(s) 204 and the container(s) 106 and/or the quarantine container(s) 206. For example, the dynamic proxy agent 104 may send traffic received from service(s) 114A and/or service(s) 114B to container(s) 106 and/or the quarantine container(s) 206 when authorized.

In some configurations, a sidecar 204 includes functionality to route the traffic to the container(s) 106 and/or the quarantine container(s) 206. In some example, when the traffic analysis performed by a sidecar 204, or some other device or component, determines that the incoming traffic is unsafe/unauthorized, the incoming traffic from that specific source (e.g., one or more of service(s) 114A and/or service(s) 114B) from a cloud service 102 is blocked from being delivered to the application container 106 to which the traffic is directed. In other configurations, incoming traffic that is identified as unsafe or unsecure may be redirected to a different location, such as to a quarantine container(s) 206. A quarantine container 206 may be used to store incoming traffic for a period of time and/or for further processing.

According to some examples, more than one quarantine container 206 may be used to process traffic that is identified by the dynamic proxy agent 104 as being unauthorized. For instance, the dynamic proxy agent 104, or some other device or component can identify available resources (e.g., available RAM, CPU, . . . ) to determine how many quarantine container(s) 206 to create. A deny rule indicating to deny traffic from the particular source may also be stored within the table 116. As described in more detail below with reference to FIG. 4, and as briefly discussed above, a micro-segmentation based security policy may be used to isolate the application containers 106 from each other which are all running on the same node.

A security manager 212 can be provided for interacting with a dynamic proxy agent 104. The security manager 212 may be used for configuring and managing the security of communications to containers 106 via the dynamic proxy agent 104. For example, the security manager 212 may configure data indicating information such as but not limited to, security policies, authorized services, denied services, micro-segmentation policies, quarantine policies, and the like. The security manager 112 may implement dynamic APIs for dynamic proxy agent configuration.

Figure 3:
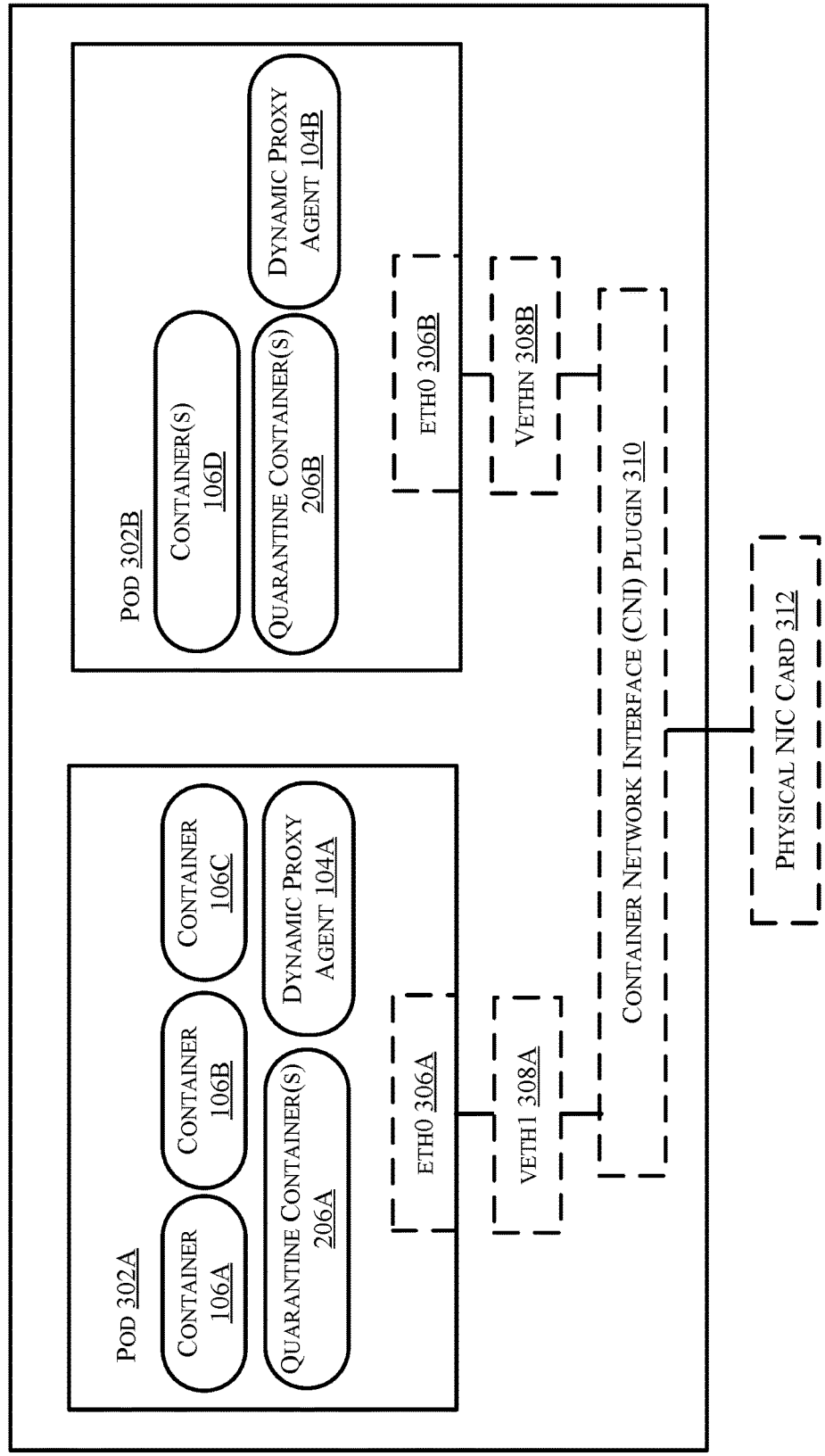
FIG. 3 illustrates an IoT edge gateway node that uses a dynamic proxy agent to secure communications.

FIG. 3 illustrates an IoT edge gateway node 300. As illustrated node 300 shows a first pod 302A that includes containers 106A-106C, dynamic proxy agents 104A-104B, quarantine container(s) 206A, and interface eth0 306A.

Node 300 also includes pod 302B that includes container(s) 106D, quarantine container(s) 206B, and interface eth0 306B. While two pods are illustrated, the IoT gateway node 300 may include fewer or more application pods 302.

According to some configurations, the interface 306A and interface 306B are coupled to a virtual interface (Veth1 308A and Veth1 308B) that are coupled to communications via the container network interface (CNI) plugin 310. The CNI plugin 310 is a network interface into the container network namespace that can be used to control traffic between the pods 302 in the node 300.

According to some examples, in contrast to abstracting an interface of a single entry point, the dynamic proxy agent 104 abstracts the IoT gateways from a security attack vector perspective by masking the MAC Address of the WIFI or ethernet NIC that is present in the gateway's physical interface, such as the physical NIC card 312. As such, the edge network interface is abstracted and a mapping is created between the different sources of incoming traffic and the application containers 106.

In some configurations, a blocking micro segmentation policy may be used to segment the different pods from each other. Quarantine containers 206, such as quarantine container(s) 206A and quarantine container(s) 206B may also be used. According to some configurations, the dynamic proxy agent 104 executes a script that adds the iptables rules to the network namespace of the pod 302 to create network microsegmentation across the different container(s) 106 running on the same pod 302. These rules may be applied to the containers 106 in that specific pod to help ensure network isolation based on the analysis of the source of traffic, type of traffic and/or the pattern of traffic.

As described, the dynamic proxy agent 104 abstracts the application container (e.g., the application containers instance identifier along with the exposed network interfaces so that they can be mapped to each container application 106. Since the dynamic proxy agent 104 is a common component that is accessible across the container applications 106 of a pod 302, the CPU and memory resources used to run the dynamic proxy agent 104 are minimal.

Figure 4:
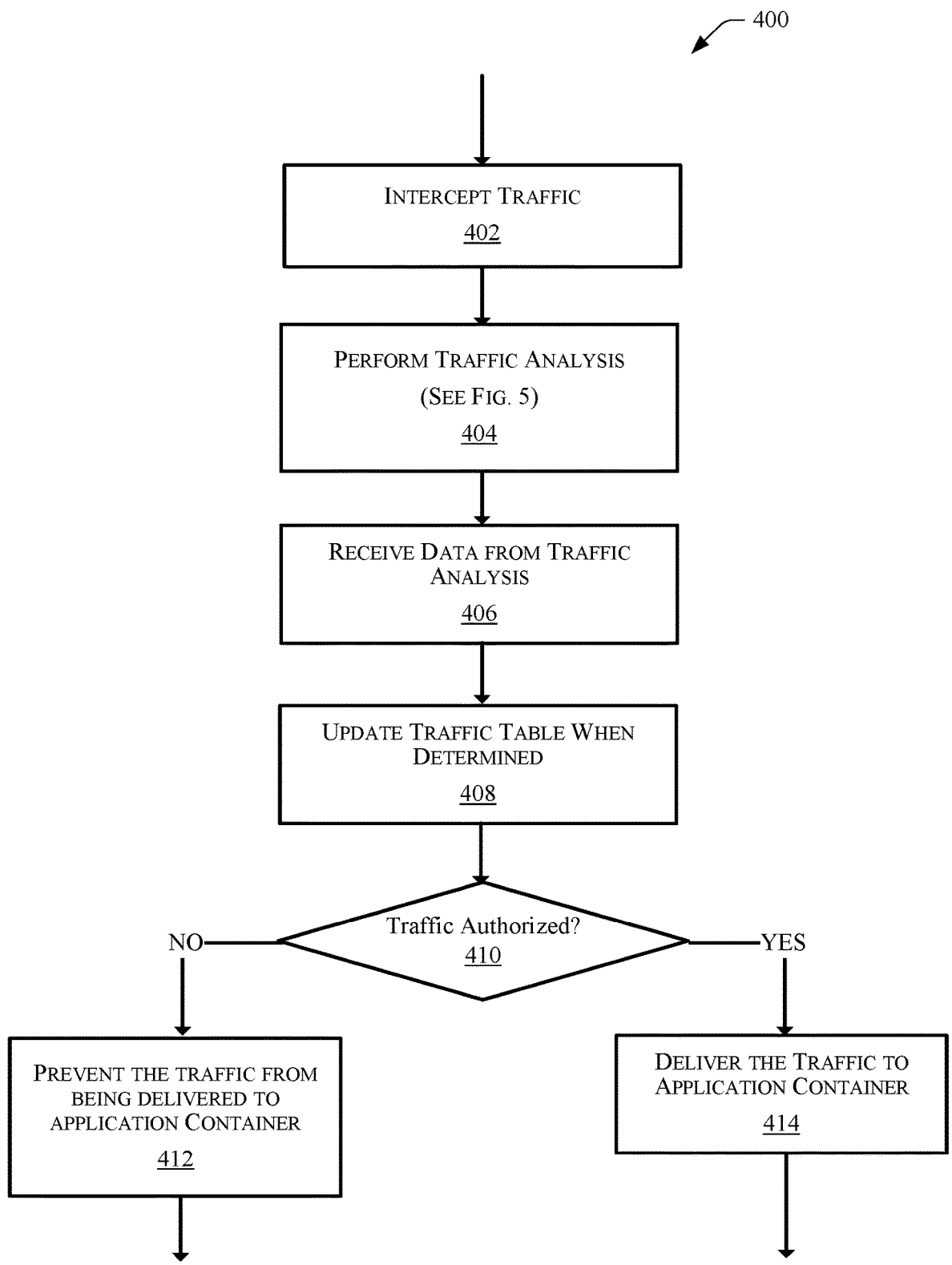
FIG. 4 is a flowchart illustrating a process for securing communications to application containers in a multi-cloud environment.

FIG. 4 is a flowchart illustrating a process 400 for securing communications to containers in a multi-cloud environment. At 402, the traffic is intercepted before delivery to a container within a node. As discussed above, the traffic may be received from an external network from the application container 106, such as from a cloud service, such as cloud service 102 as illustrated in FIG. 1 and FIG. 2.

At 404, traffic analysis is performed. In some examples, the traffic analysis may be performed by a traffic analysis engine 110, or by some other device or component. For example, the traffic analysis may be performed by the dynamic virtual proxy agent 104. In some configurations, the traffic is sent to the traffic analysis engine 110 for traffic analysis.

At 406, data from the traffic analysis is received. As discussed above, the traffic analysis may performed by the traffic analysis engine 110 may include a DPI of the traffic received from a service 114 that is hosted in a cloud service 102 and/or at some other location that is external from the application containers 106. The traffic analysis engine 110 may also identify information such as a source of the incoming traffic (e.g., the IP address of the service 114, VPC, or some other source of the traffic). In some examples, the traffic analysis engine 110 performs an end-to-end traffic analysis that identifies information the different points the incoming traffic has passed from the source to the dynamic proxy agent 104. The traffic analysis engine 110 may also identify traffic patterns that are associated with the source such as how often does the service send traffic to an application container, and the like.

At 408, the traffic table 116 is updated when determined. As discussed above, the traffic table 116 may be updated in response to an initial traffic analysis and/or updated in response to an updated analysis of traffic patterns to the container. The traffic table 116 may include sources that are authorized to send traffic to one or more application containers 106 and/or sources that are unauthorized from sending traffic to one or more application containers 106.

At 410, a determination is made as to whether the traffic is authorized. When the traffic is authorized to be delivered to the application container 106, the process 400 flows to 412. When the traffic is not authorized to be delivered to the application container 106, the process 400 flows to 414 where the traffic is delivered to the application container 106.

At 412, the traffic is prevented from being delivered to the application container 106. As discussed above, different techniques may be used to prevent delivery. For example, the traffic may be discarded, the traffic may be redirected to a quarantine container, and/or some other technique may be used.

Figure 5:
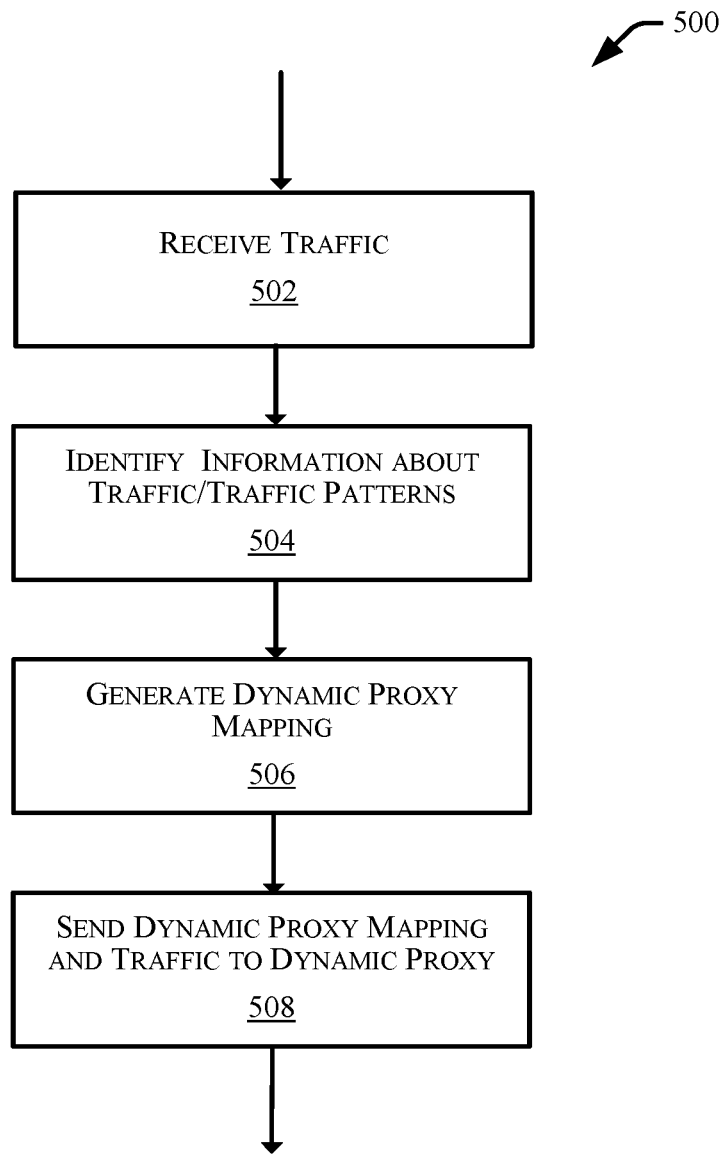
FIG. 5 is a flowchart illustrating a process for performing traffic analysis of traffic directed to an application container.

FIG. 5 is a flowchart illustrating a process 500 for performing traffic analysis of traffic directed to an application container 1096. At 502, the traffic is received for traffic analysis. As discussed above, the traffic may be received from a dynamic proxy agent 104 to which can initially receive the traffic.

At 504, the traffic analysis engine 110 identifies information about the incoming traffic such as a source of the incoming traffic, traffic patterns, as well as other information. For instance, in some examples, the traffic analysis engine 110 may perform an end-to-end analysis of the traffic.

At 506, a dynamic proxy mapping may be generated for the traffic. As discussed above, the network interface associated with an application container 106 is abstracted and a mapping is created between the different sources of incoming traffic and the application container 106. The source may be a particular source of the traffic, a VPC (Virtual Private Cloud), VPC's public subnet details, and the like. In some examples, the dynamic proxy agent 104 may add entries to the table 116 that includes data associated with the ingress (App's Network Interface) and the egress being the details of the source of the traffic. When an application on an IoT gateway wants to send data to a cloud service 102 to which it is mapped (as indicated in the traffic table 116), then the application container accesses the egress decision path via the dynamic proxy agent 104. The dynamic proxy agent 104 internally abstracts as to which cloud service is trying to communicate to and the source MAC address is masked by the dynamic proxy agent 104. Similarly, if a service 114 running in the cloud service 102 wants to communicate with an application container running on a gateway, then the dynamic proxy agent 104 masks the source of origination of that traffic by parsing through the table 116.

At 508, the dynamic proxy mapping, traffic, and other traffic information may be sent to the dynamic proxy agent 104 for further processing. For example, the dynamic proxy agent 104 may deliver the traffic, prevent the traffic from being delivered to the application container 106, send the traffic to a quarantine container 206 and/or perform some other action/operation.

Figure 6:
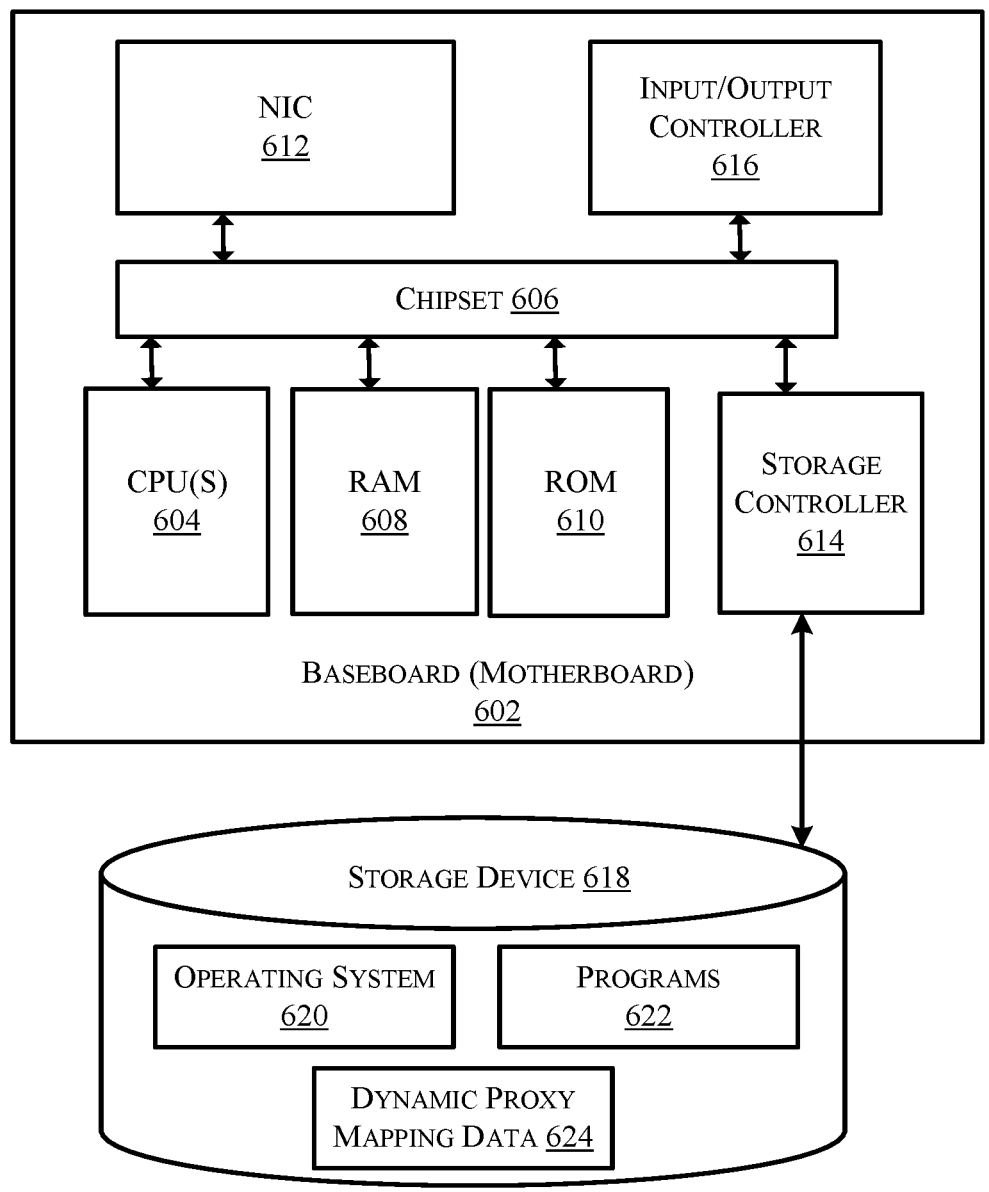
FIG. 6 illustrates an example computer architecture for a computer capable of executing program components for implementing the functionality described herein.

FIG. 6 illustrates an example computer architecture for a computer 600 capable of executing program components for implementing the functionality described above. The computer architecture shown in FIG. 6 illustrates an architecture of a server computer, workstation, desktop computer, laptop, tablet, network appliance, e-reader, smartphone, network switch, or other computing device, and can be utilized to execute any of the software components presented herein. The computer 600 may, in some examples, correspond to a network infrastructure device discussed herein.

The computer 600 includes a baseboard 602, or "motherboard," which may be a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be, for example, standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 600. The chipset 606 can further provide an interface to a computer-readable storage medium such as a read-only memory ("ROM") 610 or non-volatile RAM ("NVRAM") for storing basic routines that help to startup the computer 600 and to transfer information between the various components and devices. The ROM 610 or NVRAM can also store other software components necessary for the operation of the computer 600 in accordance with the configurations described herein. As illustrated in FIG. 6, the ROM 610 or NVRAM can also store data usable by the computer 600 to generate and/or process attestation information in messages exchanged among the computer 600 and other devices. In other examples, this data may be stored elsewhere, such as in RAM 608.

The computer 600 can operate in a networked environment using logical connections to remote computing devices and computer systems through a network. For example, the chipset 606 can include functionality for providing network connectivity through a Network Interface Controller (NIC) 612, such as a gigabit Ethernet adapter. The NIC 612 can connect the computer 600 to other computing devices over a network. It should be appreciated that multiple NICs 612 can be present in the computer 600, connecting the computer to other types of networks and remote computer systems. In some instances, the NICs 612 may include at least one ingress port and/or at least one egress port. An input/output controller 616 may be provided for other types of input/output.

The computer 600 can be connected to a storage device 618 that provides non-volatile storage for the computer. The storage device 618 can store an operating system 620, programs 622, and data 624, for example. The storage device 618 can be connected to the computer 600 through a storage controller 614 connected to the chipset 606. The storage device 618 can include one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units. The data 624 may include, for example, dynamic proxy mapping data.

The computer 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like. For example, the computer 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the storage device 618 by detecting the physical states or characteristics of one or more particular locations within the physical storage units.

In addition to the storage device 618 described above, the computer 600 can have access to other computer-readable storage media to store and retrieve information, such as program modules, data structures, or other data, including data to generate and/or process attestation information. It should be appreciated by those skilled in the art that computer-readable storage media is any available media that provides for the non-transitory storage of data and that can be accessed by the computer 600.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A method comprising:
   receiving, from sources within a cloud service and at a dynamic proxy agent, traffic that is directed to application containers that are hosted externally from the cloud service;
   performing a traffic analysis of the traffic by determining traffic patterns between the sources and the application containers;
   generating a dynamic proxy mapping between the sources and the application containers;
   receiving, at the dynamic proxy agent, a traffic flow from a source that is destined to an application container, wherein the traffic flow has a source address associated with the source;
   replacing the source address in the traffic flow with an abstraction; and
   causing at least one of delivering the traffic flow to the application container or preventing delivery of the traffic flow to the application container.

2. The method of claim 1, wherein generating the dynamic proxy mapping abstracts network interfaces associated with the application containers.

3. The method of claim 1, wherein performing the traffic analysis comprises sending the traffic to a traffic analysis engine, and wherein generating the dynamic proxy mapping is performed by the traffic analysis engine.

4. The method of claim 1, further comprising:
   creating a side car container that is associated with the application container; and
   adding one or more rules to a network namespace of an application pod that includes the application container, wherein the one or more rules create a network microsegmentation across the application containers running on the application pod.

5. The method of claim 1, wherein the application containers are hosted by an Internet of Things (TOT) gateway node.

6. The method of claim 1, wherein preventing the delivery of the traffic flow to the application container comprises sending the traffic flow to a quarantine container.

7. The method of claim 1, further comprising updating data that indicates whether delivery of the traffic flow to the application container is authorized, and wherein delivering the traffic flow to the application container is based at least in part on the data.

8. The method of claim 1, wherein the abstraction is one or more of:
   a hash value; or
   a masking of a network interface, the network interface including at least one of a WIFI interface or an Ethernet interface.

9. A system, comprising:
   one or more processors; and
   one or more non-transitory computer-readable media storing computer-executable instructions that, when executed by the one or more processors, cause the one or more processors to perform operations of:
      receiving, from sources at a first network location, traffic that is directed to application containers that are hosted at a second network location;
      performing a traffic analysis of the traffic by determining traffic patterns between the sources and the application containers;
      generating a dynamic proxy mapping between the sources and the application containers;
      receiving a traffic flow from a source that is destined to an application container, wherein the traffic flow has a source address associated with the source;
      replacing the source address in the traffic flow with an abstraction; and
      causing at least one of delivering the traffic flow to the application container or preventing delivery of the traffic flow to the application container.

10. The system of claim 9, wherein performing the traffic analysis comprises sending the traffic to a traffic analysis engine, and wherein generating the dynamic proxy mapping is performed by the traffic analysis engine.

11. The system of claim 9, the operations further comprising:
   creating a side car container that is associated with the application container; and
   adding one or more rules to a network namespace of an application pod that includes the application container, wherein the one or more rules create a network micro-segmentation across the application containers running on the application pod.

12. The system of claim 9, wherein the application containers are hosted by an Internet of Things (TOT) gateway node.

13. The system of claim 9, wherein preventing the delivery of the traffic flow to the application container comprises sending the traffic flow to a quarantine container.

14. The system of claim 9, the operations further comprising updating data that indicates whether delivery of the traffic flow to the application container is authorized, and wherein delivering the traffic flow to the application container is based at least in part on the data.

15. The system of claim 9, wherein the abstraction is one or more of:
   a hash value; or
   a masking of a network interface, the network interface including at least one of a WIFI interface or an Ethernet interface.

16. A non-transitory computer-readable media storing computer-executable instructions that, when executed by one or more processors, cause the one or more processors to perform operations of:
   receiving, from sources at a first network location, traffic that is directed to application containers that are hosted at a second network location;
   performing a traffic analysis of the traffic by determining traffic patterns between the sources and the application containers;
   generating a dynamic proxy mapping between the sources and the application containers;
   receiving a traffic flow from a source that is destined to an application container, wherein the traffic flow has a source address associated with the source;
   replacing the source address in the traffic flow with an abstraction; and
   causing at least one of delivering the traffic flow to the application container or preventing delivery of the traffic flow to the application container.

17. The non-transitory computer-readable media of claim 16, wherein performing the traffic analysis comprises sending the traffic to a traffic analysis engine, and wherein generating the dynamic proxy mapping is performed by the traffic analysis engine.

18. The non-transitory computer-readable media of claim 16, the operations further comprising:
   creating a side car container that is associated with the application container; and
   adding one or more rules to a network namespace of an application pod that includes the application container, wherein the one or more rules create a network micro-segmentation across a plurality of the application containers running on the application pod.

19. The non-transitory computer-readable media of claim 16, wherein preventing the delivery of the traffic flow to the application container comprises sending the traffic flow to a quarantine container.

20. The non-transitory computer-readable media of claim 16, the operations further comprising updating data that indicates whether delivery of the traffic flow to the application container is authorized, and wherein delivering the traffic flow to the application container is based at least in part on the data.

\* \* \* \* \*